(12) United States Patent
Kim et al.

(10) Patent No.: US 9,308,800 B2
(45) Date of Patent: Apr. 12, 2016

(54) CONTROL METHOD OF AIR CONDITIONER SYSTEM FOR VEHICLE

(71) Applicant: Hyundai Motor Company, Seoul (KR)

(72) Inventors: Jae Yeon Kim, Hwaseong-si (KR); Dong Won Park, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/274,190

(22) Filed: May 9, 2014

(65) Prior Publication Data
US 2015/0165870 A1    Jun. 18, 2015

(30) Foreign Application Priority Data

Dec. 18, 2013  (KR) .................... 10-2013-0158689

(51) Int. Cl.
*B60H 1/00* (2006.01)
*F01P 7/14* (2006.01)

(52) U.S. Cl.
CPC ........ *B60H 1/00978* (2013.01); *B60H 1/00885* (2013.01); *B60H 1/00735* (2013.01)

(58) Field of Classification Search
CPC ........... B60H 1/00978; B60H 1/00735; B60H 1/00885; F01P 7/14
USPC ......................................................... 701/36
See application file for complete search history.

(56) References Cited

U.S. PATENT DOCUMENTS

| 4,590,772 A * | 5/1986 | Nose et al. ...................... 62/184 |
| 5,133,302 A * | 7/1992 | Yamada ............... B60H 1/3208 123/41.12 |
| 6,067,489 A * | 5/2000 | Letang et al. .................... 701/36 |
| 6,453,853 B1 * | 9/2002 | Hawkins et al. ........... 123/41.12 |
| 2005/0045321 A1* | 3/2005 | Yamazaki ..................... 165/202 |
| 2011/0232868 A1* | 9/2011 | Iwasaki et al. ........... 165/104.13 |

FOREIGN PATENT DOCUMENTS

| JP | 2782968 B2 | 5/1998 |
| JP | 2842020 B2 | 10/1998 |
| JP | 3358303 B2 | 12/2002 |
| JP | 4985594 B2 | 7/2012 |
| KR | 10-0342774 B1 | 10/2002 |
| KR | 10-2011-0093102 A | 8/2011 |
| KR | 10-2011-0134213 A | 12/2011 |

* cited by examiner

*Primary Examiner* — Muhammad Shafi
*Assistant Examiner* — Majdi Alsomiri
(74) *Attorney, Agent, or Firm* — Morgan, Lewis & Bockius LLP

(57) ABSTRACT

Disclosed is a control method of an air conditioner system for a vehicle. The air conditioner system is integrated with a cooling system and includes a water-cooled condenser embedded in an intercooler radiator and an air-cooled condenser placed in front of the intercooler radiator. The control method may include (A) circulating the refrigerant in the air conditioner system through actuation of a compressor by sensing actuation of an air conditioner while driving the vehicle in a state in which the start of the vehicle is on, (B) actuating a water pump circulating the cooling water and a cooling fan blowing wind to a cooling module, and (C) controlling the actuation of the compressor by judging whether the vehicle is in a failure mode in a state where the air conditioner is actuated or normally driving the compressor and the cooling fan and ending the control.

5 Claims, 2 Drawing Sheets

CONTROL METHOD OF AIR CONDITIONER SYSTEM FOR VEHICLE

CROSS-REFERENCE TO RELATED APPLICATION

The present application claims priority of Korean Patent Application Number 10-2013-0158689 filed on Dec. 18, 2013, the entire contents of which application are incorporated herein for all purposes by this reference.

BACKGROUND OF INVENTION

1. Field of Invention

The present invention relates to a control method of an air conditioner system for a vehicle, and more particularly, to a control method of an air conditioner system for a vehicle that secures reliabilities of a cooling system and an air conditioner system by controlling an actuation of a compressor in a failure mode of the vehicle depending on an error of pressure of an air conditioner, failure of an engine cooling water temperature sensor, failure of a vehicle velocity, a normal range of an engine cooling water temperature, and/or a normal range of an intercooler cooling water temperature in order to protect an air conditioner system integrated with a cooling system and the vehicle.

2. Description of Related Art

In general, an air conditioning device applied to a vehicle includes an air conditioner system which is an air conditioning device for heating and cooling the interior of the vehicle.

The air conditioner system can maintain a fresh indoor environment by keeping an indoor temperature of an vehicle to an appropriate temperature regardless of a change in outdoor temperature, and is configured to heat or cool the interior of the vehicle by heat-exchange by an evaporator during a process in which a refrigerant discharged by driving a compressor is circulated to the compressor again by passing through a condenser, a receiver dryer, an expansion valve, and the evaporator.

That is, in the air conditioner system, a high-temperature and high-pressure gaseous refrigerant compressed by the compressor is condensed through the condenser and thereafter, evaporated by the evaporator through the receiver drier and the expansion valve to lower the indoor temperature and humidity in a summer cooling mode.

Herein, when a water-cooled condenser is applied to the air conditioner system in cooling for condensing the refrigerant, cooling water is condensed through heat-exchange with the refrigerant in the condenser.

Meanwhile, in recent years, an intercooler has been applied to improve an output of the vehicle and is divided into an air-cooled intercooler or a water-cooled intercooler according to a method of cooling suctioned air.

In the air conditioner system of a vehicle applied with a system that cools the water-cooled condenser by using a radiator that cools the water-cooled intercooler through simultaneous application of the water-cooled intercooler and the water-cooled condenser as described above, when a vehicle is stopped while an engine is most heated after hard acceleration on a climbing road such as a mountainous area or when a vehicle starts after stopping in an idle state, with an air conditioner turned off, after driving the vehicle under an intercooler overload condition, heat accumulated in the intercooler flows into the radiator, but driving wind does not flow into the radiator to increase the temperature of the cooling water, and as a result, the refrigerant cannot be cooled by the cooling water in the water-cooled condenser and the refrigerant is rather heated to make the refrigerant having the increased temperature flow into the compressor.

Then, an internal temperature of the compressor is increased, and as a result, durability deteriorates and reliability of the air conditioner system deteriorates.

As a result, as described above, when a durability problem of the compressor may occur, there is a need for a control logic that prevents a vehicle from not being driven due to a vehicle and air conditioner system failure mode by actively controlling the compressor depending on an error of an air conditioner pressure, failure of an engine cooling water temperature sensor, failure of a vehicle velocity sensor, a normal range of an engine cooling water temperature, and a normal range of an intercooler cooling water temperature, in order to protect the vehicle and the air conditioner system.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide an air conditioner system control method for a vehicle in which a water-cooled condenser is installed in an intercooler radiator and an air-cooled condenser is placed on the front of the intercooler radiator in a vehicle, to which a water-cooled intercooler is applied, to configure the air conditioner system integrated with a cooling system, and an actuation of a compressor is controlled in a failure mode of the vehicle depending on an error of an air conditioner pressure, failure of an engine cooling water temperature sensor, failure of a vehicle velocity sensor, a normal range of an engine cooling water temperature, and a normal range of an intercooler cooling water temperature in order to protect the air conditioner system and the vehicle, thereby securing reliabilities of the cooling system and the air conditioner system.

Various aspects of the present invention provide a control method of an air conditioner system for a vehicle, wherein the air conditioner system is integrated with a cooling system to cool an engine and an intercooler, and the air conditioner system includes a water-cooled condenser embedded in an intercooler radiator and configured to condense a refrigerant by receiving cooling water cooling the intercooler in the cooling system, and an air-cooled condenser placed in front of the intercooler radiator and configured to condense the refrigerant supplied from the water-cooled condenser through heat-exchange with outdoor air. The control method may include (A) circulating the refrigerant in the air conditioner system through actuation of a compressor by sensing actuation of an air conditioner while driving the vehicle in a state in which the start of the vehicle is on, (B) actuating a water pump circulating the cooling water and a cooling fan blowing wind to a cooling module, and (C) controlling the actuation of the compressor by judging whether the vehicle is in a failure mode in a state in which the air conditioner is actuated or normally driving the compressor and the cooling fan and ending the control.

Process (A) may include driving the vehicle by turning on the start of the vehicle, sensing whether the air conditioner is actuated, and actuating the compressor to circulate the refrigerant in the air conditioner system.

Process (B) may include driving the water pump to circulate the cooling water to the intercooler from the intercooler radiator in the cooling module including an engine radiator, the intercooler radiator, the water-cooled condenser, and the air-cooled condenser, and actuating the cooling fan to blow wind to the cooling module, into which the cooling water having an increased temperature flows, together with the outdoor air.

Process (C) may include judging whether the vehicle is in the failure mode while the vehicle travels in a state in which the air conditioner is actuated, stopping the actuation of the compressor or reducing a driving amount through a variable control, and returning to the process (B) if it is judged that the vehicle is in the failure mode, normally driving the compressor if it is judged that the vehicle is not in the failure mode, and normally actuating the cooling fan and ending the control when the compressor is normally actuated.

The failure mode may include a case in which an error or a failure occurs in any one of an air conditioner pressure, an engine cooling water temperature sensor, a vehicle velocity sensor, a normal range of an engine cooling water temperature, and/or a normal range of an intercooler cooling water temperature.

The compressor may include a variable capacitive compressor capable of controlling a compression flow rate of the refrigerant by controlling a driving amount. The water pump may include an electric water pump, and a flow rate of the cooling water circulated may be controlled by controlling an actuation velocity in accordance with a control signal of an ECU (electronic control unit).

According to various aspects of the present invention, in a control method of an air conditioner system for a vehicle, a water-cooled condenser is installed in an intercooler radiator and an air-cooled condenser is placed on the front of the intercooler radiator in a vehicle to which a water-cooled intercooler is applied, to configure the air conditioner system integrated with a cooling system, and an actuation of a compressor is controlled in a failure mode of the vehicle in which an error or a failure occurs in an air conditioner pressure, an engine cooling water temperature sensor, a vehicle velocity sensor, a normal range of an engine cooling water temperature, and/or a normal range of an intercooler cooling water temperature in order to protect the air conditioner system and the vehicle, thereby securing reliabilities of the cooling system and the air conditioner system.

The vehicle is prevented from not being driven due to damage to the vehicle and air conditioner system by the failure mode by actively controlling the compressor depending on the error of the air conditioner pressure, the failure of the engine cooling water temperature sensor, the failure of the vehicle velocity sensor, the normal range of the engine cooling water temperature, and the normal range of the intercooler cooling water temperature, thereby preventing a field claim and improving merchantability of the vehicle.

The vehicle is prevented from not being driven due to damage to the vehicle and air conditioner system by the failure mode by actively controlling the compressor depending on the error of the air conditioner pressure, the failure of the engine cooling water temperature sensor, the failure of the vehicle velocity sensor, the normal range of the engine cooling water temperature, and the normal range of the intercooler cooling water temperature, thereby preventing a field claim and improving merchantability of the vehicle.

Durability of the vehicle and the air conditioner system can be secured, and cooling performance and fuel efficiency are improved by using both a water-cooled condenser and an air-cooled condenser.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

In addition, unless explicitly described to the contrary, the word "comprise" and variations such as "comprises" or "comprising", will be understood to imply the inclusion of stated elements but not the exclusion of any other elements.

Figure 1:
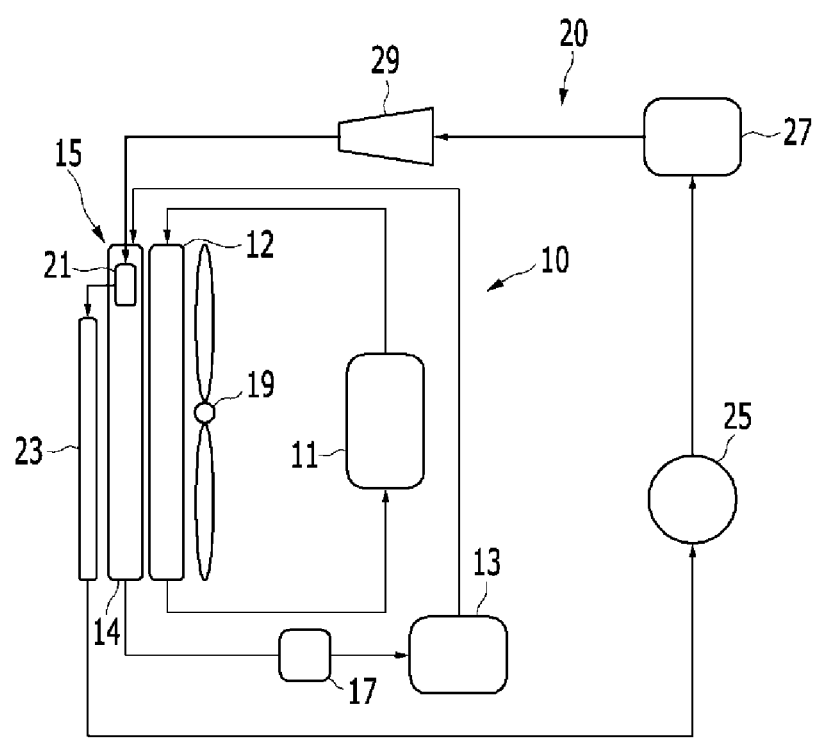
FIG. 1 is a block configuration diagram of an exemplary air conditioner system for a vehicle according to the present invention.
Figure 2:
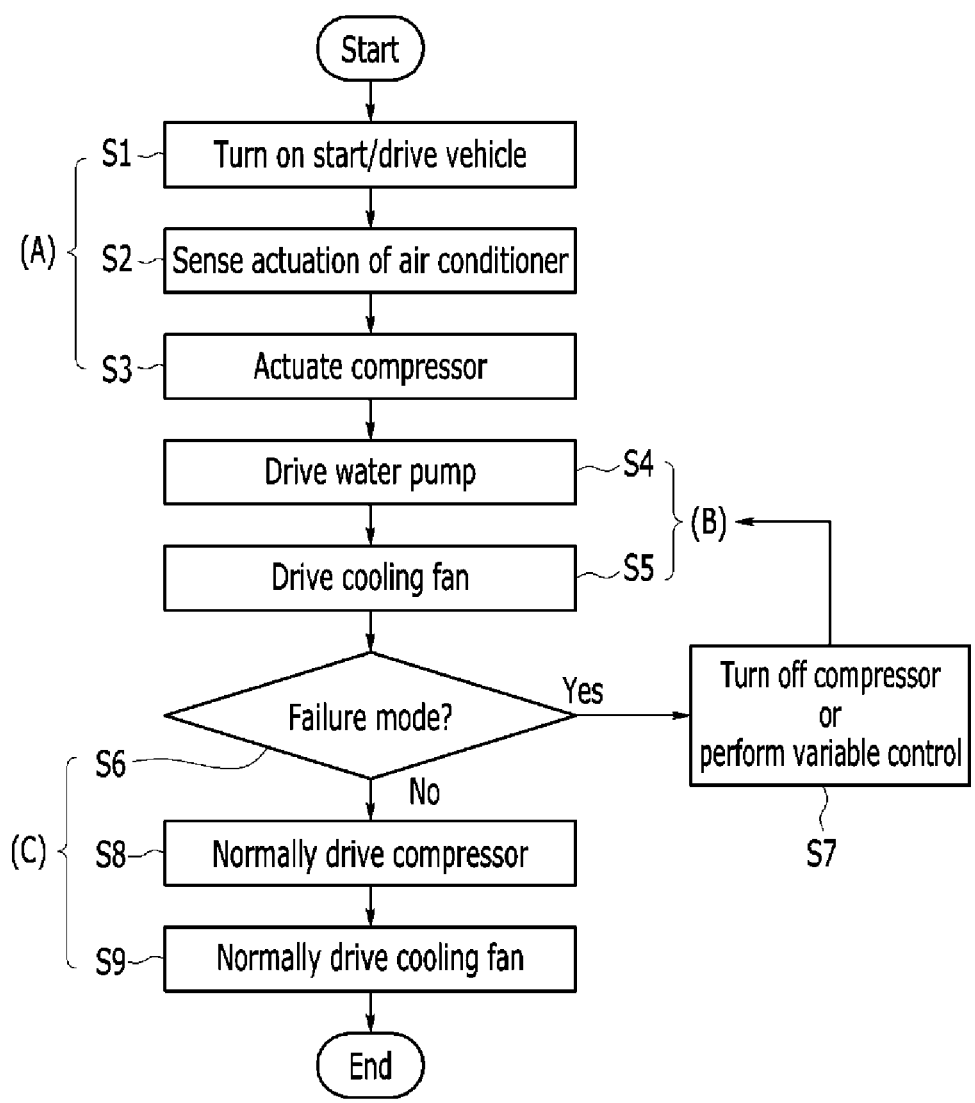
FIG. 2 is a control flowchart for describing an exemplary air conditioner system control method for a vehicle according to the present invention.

FIG. 1 is a block configuration diagram of a vehicle cooling and air conditioner system to which an air conditioner system control method for a vehicle according to various embodiments of the present invention is applied. FIG. 2 is a control flowchart for describing an air conditioner system control method for a vehicle according to various embodiments of the present invention. Referring to the drawings, the air conditioner system control method for a vehicle according to various embodiments of the present invention is applied to an air conditioner system 20 integrated with a cooling system 10 of the vehicle.

First, as illustrated in FIG. 1, the cooling system 10 is configured to include an engine 11, an engine radiator 12 which cools cooling water through heat-exchange with outdoor air and has a cooling fan 19 provided in the rear thereof, an intercooler 13, an intercooler radiator 14 which is placed in front of the engine radiator 12, and cools the cooling water through the heat-exchange with the outdoor air and supplies the cooled cooling water to the intercooler 13, and a water pump 17 which circulates the cooling water cooled in each of the radiators 12 and 14.

The air conditioner system 20 includes a water-cooled condenser 21 which is installed in the intercooler radiator 14 and condenses a refrigerant through heat-exchange between the cooling water and the refrigerant, and an air-cooled condenser 23 which is placed in front of the intercooler radiator 12 and additionally condenses the condensed refrigerant discharged from the water-cooled condenser 21 through heat-exchange with the outdoor air.

Herein, the engine radiator 12, the intercooler radiator 14, the water-cooled condenser 21, the air-cooled condenser 23, and the cooling fan 19 are included in a cooling module 15 that integrates the cooling system 10 and the air conditioner system 20.

The air conditioner system 20 is configured to further (additionally or optionally) include an expansion valve 25 which expands the refrigerant discharged from the air-cooled condenser 23, an evaporator 27 which evaporates the expanded refrigerant supplied from the expansion valve 25, and a compressor 29 which receives and compresses the refrigerant discharged from the evaporator 27 and supplies the compressed refrigerant to the water-cooled condenser 21.

Meanwhile, in the air conditioner system 20, the refrigerant is discharged from the water-cooled condenser 21 and introduced into the air-cooled condenser 23 and condensed while sequentially passing through the water-cooled condenser 21 and the air-cooled condenser 23.

Herein, in the air conditioner system control method for a vehicle according to various embodiments of the present invention, the water-cooled condenser 21 is installed in the intercooler radiator 14 and the air-cooled condenser 23 is placed on the front of the intercooler radiator 14 in a vehicle to which the water-cooled intercooler 13 is applied, to configure the air conditioner system 20 integrated with the cooling system 10, and an actuation of the compressor 29 is controlled in a failure mode of the vehicle depending on an error of air conditioner pressure, failure of an engine cooling water temperature sensor, failure of a vehicle velocity sensor, a normal range of an engine cooling water temperature, and/or a normal range of an intercooler cooling water temperature in order to protect the air conditioner system 20 and the vehicle, thereby securing reliabilities of the cooling system 10 and the air conditioner system 20.

To this end, as illustrated in FIG. 2, the air conditioner system control method for a vehicle according to various embodiments of the present invention includes (A) circulating the refrigerant in the air conditioner system 20 through actuation of the compressor 29 by sensing actuation of an air conditioner while driving the vehicle in a state in which the start of the vehicle is on, (B) actuating the water pump 17 circulating the cooling water and the cooling fan 19 blowing wind to the cooling module 15, and (C) controlling the actuation of the compressor 29 by judging whether the vehicle is in the failure mode in a state in which the air conditioner is actuated or normally driving the compressor 29 and the cooling fan 19 and ending the control.

First, in process (A), in a state (S1) in which the vehicle is driven by turning on the start of the vehicle, it is sensed whether the air conditioner is actuated (S2) and the compressor 29 is actuated so that the refrigerant is circulated in the air conditioner system (S3).

Thereafter, in process (B), the water pump 17 is driven so that the cooling water is circulated to the intercooler 13 from the intercooler radiator 14 in the cooling module 15 described above (S4), and the cooling fan 19 is actuated so as to cool the cooling module 15 into which the cooling water having the increased temperature flows by blowing wind together with the outdoor air, while cooling each of the engine 11 and the intercooler 13 (S5).

Herein, the water pump 17 is configured to include an electric water pump, and an actuation velocity thereof is controlled according to a control signal of an ECU to control the flow rate of the circulated cooling water.

In addition, in process (C), it is judged whether the vehicle is in the failure mode while the vehicle is driven in a state in which the air conditioner is actuated (S6).

Herein, the failure mode may include a case in which the error occurs in any one of the error of the air conditioner pressure, the failure of the engine cooling water temperature sensor, the failure of the vehicle velocity sensor, the normal range of the engine cooling water temperature, and/or the normal range of the intercooler cooling water temperature.

That is, in step (S6), when it is judged that the vehicle is in the failure mode due to the error of any one of the air conditioner pressure, the failure of the engine cooling water temperature sensor, the failure of the vehicle velocity sensor, the normal range of the engine cooling water temperature, and/or the normal range of the intercooler cooling water temperature, the actuation of the compressor 29 is stopped or a driving amount is reduced through a variable control, and the process returns to process (B) (S7), and the aforementioned steps are repeatedly performed from process (B).

That is, in the failure mode of the vehicle, the actuation of the compressor 29 is stopped or a flow quantity of the refrigerant is controlled through the variable control to prevent the pressure of the air conditioner system 20 from being increased, and the temperature of the compressor 29 is prevented from being increased, thereby improving durability of the compressor 29.

On the contrary, in step (S6), when it is judged that the vehicle is not in the failure mode because the error does not occur in any one of the error of the air conditioner pressure, the failure of the engine cooling water temperature sensor, the failure of the vehicle velocity sensor, the normal range of the engine cooling water temperature, and the normal range of the intercooler cooling water temperature, the compressor 29 is normally driven (S8).

In addition, when the compressor 29 is normally actuated (S8), the cooling fan 19 is normally actuated (S9) and the control is ended.

Herein, the compressor 29 may be configured to include a variable capacitive compressor capable of controlling a compression flow rate of the refrigerant by controlling a driving amount.

Therefore, when the air-conditioner system control method for a vehicle according to various embodiments of the present invention, which is configured as above, is applied, the water-cooled condenser 21 is installed in the intercooler radiator 14 and the air-cooled condenser 23 is placed on the front of the intercooler radiator 14 in a vehicle to which the water-cooled intercooler 13 is applied, to configure the air conditioner system 20 integrated with the cooling system 10, and actuation of the compressor 29 is controlled in a failure mode of the vehicle depending on the error of the air conditioner pressure, the failure of the engine cooling water temperature sensor, the failure of the vehicle velocity sensor, the normal range of the engine cooling water temperature, and/or the normal range of the intercooler cooling water temperature in order to protect the air conditioner system 20 and the vehicle, thereby securing reliabilities of the cooling system 10 and the air conditioner system 20.

Further, the vehicle is prevented from not being driven due to damage to the vehicle and air conditioner system 20 by the failure mode by actively controlling the compressor 29 depending on the error of the air conditioner pressure, the failure of the engine cooling water temperature sensor, the failure of the vehicle velocity sensor, the normal range of the engine cooling water temperature, and the normal range of the intercooler cooling water temperature, thereby preventing a field claim and improving merchantability of the vehicle.

The durability of the vehicle and the air conditioner system 20 may be secured, and cooling performance and fuel efficiency may be improved by using both the water-cooled condenser 21 and the air-cooled condenser 23.

For convenience in explanation and accurate definition in the appended claims, the terms "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A control method of an air conditioner system for a vehicle, wherein the air conditioner system is integrated with a cooling system to cool an engine and an intercooler, and the air conditioner system includes a water-cooled condenser embedded in an intercooler radiator and configured to condense a refrigerant by receiving cooling water cooling the intercooler in the cooling system, and an air-cooled condenser placed in front of the intercooler radiator and configured to condense the refrigerant supplied from the water-cooled condenser through heat-exchange with outdoor air, the method comprising:
   (A) circulating the refrigerant in the air conditioner system through actuation of a compressor by sensing actuation of an air conditioner while driving the vehicle in a state in which the start of the vehicle is on;
   (B) actuating a water pump circulating the cooling water and a cooling fan blowing wind to a cooling module; and
   (C) controlling the actuation of the compressor by judging whether the vehicle is in a failure mode in a state in which the air conditioner is actuated or normally driving the compressor and the cooling fan and ending the control,
   wherein the process (C) includes:
      judging whether the vehicle is in the failure mode while the vehicle travels in a state in which the air conditioner is actuated;
      stopping the actuation of the compressor or reducing a driving amount through a variable control, and returning to the process (B) if it is judged that the vehicle is in the failure mode;
      normally driving the compressor if it is judged that the vehicle is not in the failure mode; and
      normally actuating the cooling fan and ending the control when the compressor is normally actuated, and
   wherein the failure mode includes a case in which an error or a failure occurs in any one of a plurality of predetermined factors after checking every one of the predetermined factors, the predetermined factors including an air conditioner pressure, an engine cooling water temperature sensor, a vehicle velocity sensor, a normal range of an engine cooling water temperature, and/or a normal range of an intercooler cooling water temperature.

2. The method of claim 1, wherein the process (A) includes:
   driving the vehicle by turning on the start of the vehicle;
   sensing whether the air conditioner is actuated; and
   actuating the compressor to circulate the refrigerant in the air conditioner system.

3. The method of claim 1, wherein the process (B) includes:
   driving the water pump to circulate the cooling water to the intercooler from the intercooler radiator in the cooling module including an engine radiator, the intercooler radiator, the water-cooled condenser, and the air-cooled condenser; and
   actuating the cooling fan to blow wind to the cooling module, into which the cooling water having an increased temperature flows, together with the outdoor air.

4. The method of claim 1, wherein:
   the compressor includes a variable capacitive compressor capable of controlling a compression flow rate of the refrigerant by controlling a driving amount.

5. The method of claim 1, wherein:
   the water pump includes an electric water pump, and a flow rate of the cooling water circulated is controlled by controlling an actuation velocity in accordance with a control signal of an ECU (electronic control unit).

* * * * *